US010054667B2

(12) United States Patent
Slapak et al.

(10) Patent No.: US 10,054,667 B2
(45) Date of Patent: Aug. 21, 2018

(54) OBSTACLE DETECTION RADAR USING A POLARIZATION TEST

(71) Applicant: RODradar Ltd., Rinatya (IL)

(72) Inventors: Alon Slapak, Mazor (IL); Haim Niv, Hod-Hasharon (IL)

(73) Assignee: RODRADAR Ltd., Rinatya (IL)

( * ) Notice: Subject to any disclaimer, the term of this patent is extended or adjusted under 35 U.S.C. 154(b) by 542 days.

(21) Appl. No.: 14/805,503

(22) Filed: Jul. 22, 2015

(65) Prior Publication Data
US 2018/0074166 A1    Mar. 15, 2018

(51) Int. Cl.
| | |
|---|---|
| *G01S 13/04* | (2006.01) |
| *G01S 7/02* | (2006.01) |
| *G01S 7/41* | (2006.01) |
| *G01S 13/94* | (2006.01) |
| *G01S 13/26* | (2006.01) |

(52) U.S. Cl.
CPC .............. *G01S 7/026* (2013.01); *G01S 7/411* (2013.01); *G01S 13/04* (2013.01); *G01S 13/26* (2013.01); *G01S 13/94* (2013.01)

(58) Field of Classification Search
CPC .......... G01S 13/04; G01S 13/26; G01S 13/94; G01S 7/411; G01S 13/10; G01S 13/9303; G01S 7/025

USPC ............................................... 342/29
See application file for complete search history.

(56) References Cited

U.S. PATENT DOCUMENTS

| | | | | |
|---|---|---|---|---|
| 5,500,646 A | * | 3/1996 | Zrnic | G01S 7/024 342/188 |
| 2008/0284640 A1 | * | 11/2008 | Raney | G01S 7/026 342/159 |

FOREIGN PATENT DOCUMENTS

WO      2013164811      11/2013

* cited by examiner

*Primary Examiner* — Timothy A Brainard
(74) *Attorney, Agent, or Firm* — Heidi Brun Associates Ltd.

(57) ABSTRACT

A system for detecting a target, the system comprises a transceiver and a signal processor; wherein the transceiver that is configured to: transmit a first pulse train that comprises multiple radio frequency (RF) pulses of a first non-linear polarity; receive first echoes resulting from the transmission of the first pulse train; generate first detection signals that represent the first echoes; and wherein the signal processor is configured to process the first detection signals to provide an estimated polarization orientation of a target; wherein the processing of the first detection signals comprises estimating a Jones matrix of the target.

22 Claims, 11 Drawing Sheets

OBSTACLE DETECTION RADAR USING A POLARIZATION TEST

FIELD OF THE INVENTION

The present invention relates to radar systems for obstacle detection using a polarization test.

BACKGROUND

Collisions with obstacles such as suspended wires and point obstacles such as pylons account for a large percentage of severe and fatal helicopter and other aircraft accidents, especially, but not only during bad visibility conditions and adverse weather. The need for a device that would provide adequate warning against such obstacles is well known for aircraft which are required to fly low. These include, but are not limited to, medical evacuation (MEDEVAC), search and rescue (S&R) and police helicopters. Other categories of aircraft which require obstacle detection and warning include unmanned air vehicles (UAVs), and transport aircraft.

Prior art sensor systems apparently do not detect wires effectively. These include, for example, millimetric wave radar, laser radar, FLIR and more. These prior art systems are complex, heavy and costly and only achieve a limited success in detecting wires.

PCT patent application publication serial number WO/2013/164811A discloses a system for detecting wires using polarized waves. Basically, this system includes a transmitter for transmitting multi-polarized waves, means for receiving waves reflected off target and means for analyzing the polarization of the reflected waves to detect linearly polarized echoes characteristic of wires.

SUMMARY

According to an embodiment of the invention there may be provided a system, method and computer readable medium for detecting targets as illustrated in the claims and the specification.

According to an embodiment of the invention there may be provided a system for detecting a target, the system may include a transceiver and a signal processor; wherein the transceiver may be configured to: transmit a first pulse train that may include multiple radio frequency (RF) pulses of a first non-linear polarity; receive first echoes resulting from the transmission of the first pulse train; generate first detection signals that represent the first echoes; wherein the signal processor may be configured to process the first detection signals to provide an estimated polarization orientation of a target; wherein the processing of the first detection signals may include estimating a Jones matrix of the target.

The first detection signals represent different polarization components of the first echoes.

The transceiver may be configured to: transmit a second pulse train that may include multiple radio frequency (RF) pulses of a linear polarity of a first polarization orientation that approximates the estimated polarization orientation of the target; receive second echoes resulting from the transmission of the second pulse train; and generate second detection signals that represent the second echoes; and wherein the signal processor may be configured to process the second detection signals.

The second detection signals represent different polarization components of the first echoes.

The signal processor may be configured to process the second detection signals to verify the estimated polarization of the target.

The transceiver may be configured to: transmit a third pulse train that may include multiple radio frequency (RF) pulses of a linear polarity of a second polarization orientation that may be oriented to the estimated polarization orientation of the target; receive third echoes resulting from the transmission of the third pulse train; and generate third detection signals that represent the third echoes; and wherein the signal processor may be configured to process the third detection signals to verify the estimated polarization orientation of the target.

The third detection signals represent different polarization components of the third echoes.

The second polarization orientation may be normal to the estimated polarization orientation of the target.

The first non-linear polarization may be a circular polarization.

The system may be configured to calculate distortion parameters of the system; wherein the estimating of the Jones matrix of the target may be responsive to the distortion parameters of the target.

The transceiver may be configured to generate a first set of detection signals for each first echo, wherein the first set of detection signals represents multiple first echo intensity and phase values that were received at different points in time.

The signal processor may be configured to apply a frequency analysis of first sets of detection signals that are associated with each of the first echoes to provide a frequency analysis result.

The signal processor may be configured to perform a target detection process and a polarization test in response to the frequency analysis result.

The frequency analysis may include performing a discrete Fourier transform.

The system may be configured to estimate a ratio between axes of a polarization of received signals.

According to an embodiment of the invention there may be provided a system for detecting a target, the system may include a transceiver and a signal processor; wherein the transceiver that may be configured to: transmit a first pulse train that may include multiple radio frequency (RF) pulses of a first non-linear polarity; receive, by a multiple polarization antenna, first echoes resulting from the transmission of the first pulse train; generate first detection signals that represent first polarization components of the first echoes; generate second detection signals that represent second polarization components of the first echoes; wherein the first polarization components are associated with a first polarization; wherein the second polarization components are associated with a second polarization that differs from the first polarization; wherein the signal processor may be configured to process the first detection signals to provide an estimated polarization orientation of a target, in response to (a) a ratio between (i) intensities of the first polarization components and (ii) intensities of the second polarization components, and in response to (b) phase differences between the first and second polarization components.

$\rho$ is a ratio between an average of an absolute value of intensities of the first polarization components and an average of an absolute value of intensities of the second polarization components, and wherein $\emptyset$ is an average of the phase differences between the first and second polarization components; wherein the estimated polarization orientation of a target equals $$\frac{1}{2} * \arccos\left(\frac{(1-\rho^2)}{\sqrt{(1+\rho^2+2\rho\sin(\emptyset))} * \sqrt{(1+\rho^2-2\rho\sin(\emptyset))}}\right)$$

According to an embodiment of the invention there may be provided a method for detecting a target, the method may include: transmitting a first pulse train that may include multiple radio frequency (RF) pulses of a first non-linear polarity; receiving first echoes resulting from the transmission of the first pulse train; generating first detection signals that represent the first echoes; processing, by a hardware processor, the first detection signals to provide an estimated polarization orientation of a target; wherein the processing of the first detection signals may include estimating a Jones matrix of the target.

According to an embodiment of the invention there may be provided a method for detecting a target, the method may include: transmitting a first pulse train that may include multiple radio frequency (RF) pulses of a first non-linear polarity; receiving, by a multiple polarization antenna, first echoes resulting from the transmission of the first pulse train; generating first detection signals that represent first polarization components of the first echoes; generating second detection signals that represents second polarization components of the first echoes; wherein the first polarization components are associated with a first polarization; wherein the second polarization components are associated with a second polarization that differs from the first polarization; processing the first detection signals to provide an estimated polarization orientation of a target, in response to (a) a ratio between (i) intensities of the first polarization components and (ii) intensities of the second polarization components, and in response to (b) phase differences between the first and second polarization components.

$\rho$ is a ratio between an average of an absolute value of intensities of the first polarization components and an average of an absolute value of intensities of the second polarization components, and wherein $\emptyset$ is an average of the phase differences between the first and second polarization components; wherein the estimated polarization orientation of a target equals $$\frac{1}{2} * \arccos\left(\frac{(1-\rho^2)}{\sqrt{(1+\rho^2+2\rho\sin(\emptyset))} * \sqrt{(1+\rho^2-2\rho\sin(\emptyset))}}\right)$$

According to an embodiment of the invention there may be provided a non-transitory computer readable medium that stores instructions that once executed by a computer causes the computer to execute the steps of transmitting a first pulse train that may include multiple radio frequency (RF) pulses of a first non-linear polarity; receiving, by a multiple polarization antenna, first echoes resulting from the transmission of the first pulse train; generating first detection signals that represent first polarization components of the first echoes; generating second detection signals that represents second polarization components of the first echoes; wherein the first polarization components are associated with a first polarization; wherein the second polarization components are associated with a second polarization that differs from the first polarization; processing the first detection signals to provide an estimated polarization orientation of a target, in response to (a) a ratio between (i) intensities of the first polarization components and (ii) intensities of the second polarization components, and in response to (b) phase differences between the first and second polarization components.

$\rho$ is a ratio between an average of an absolute value of intensities of the first polarization components and an average of an absolute value of intensities of the second polarization components, and wherein $\emptyset$ is an average of the phase differences between the first and second polarization components; wherein the estimated polarization orientation of a target equals $$\frac{1}{2} * \arccos\left(\frac{(1-\rho^2)}{\sqrt{(1+\rho^2+2\rho\sin(\emptyset))} * \sqrt{(1+\rho^2-2\rho\sin(\emptyset))}}\right).$$

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
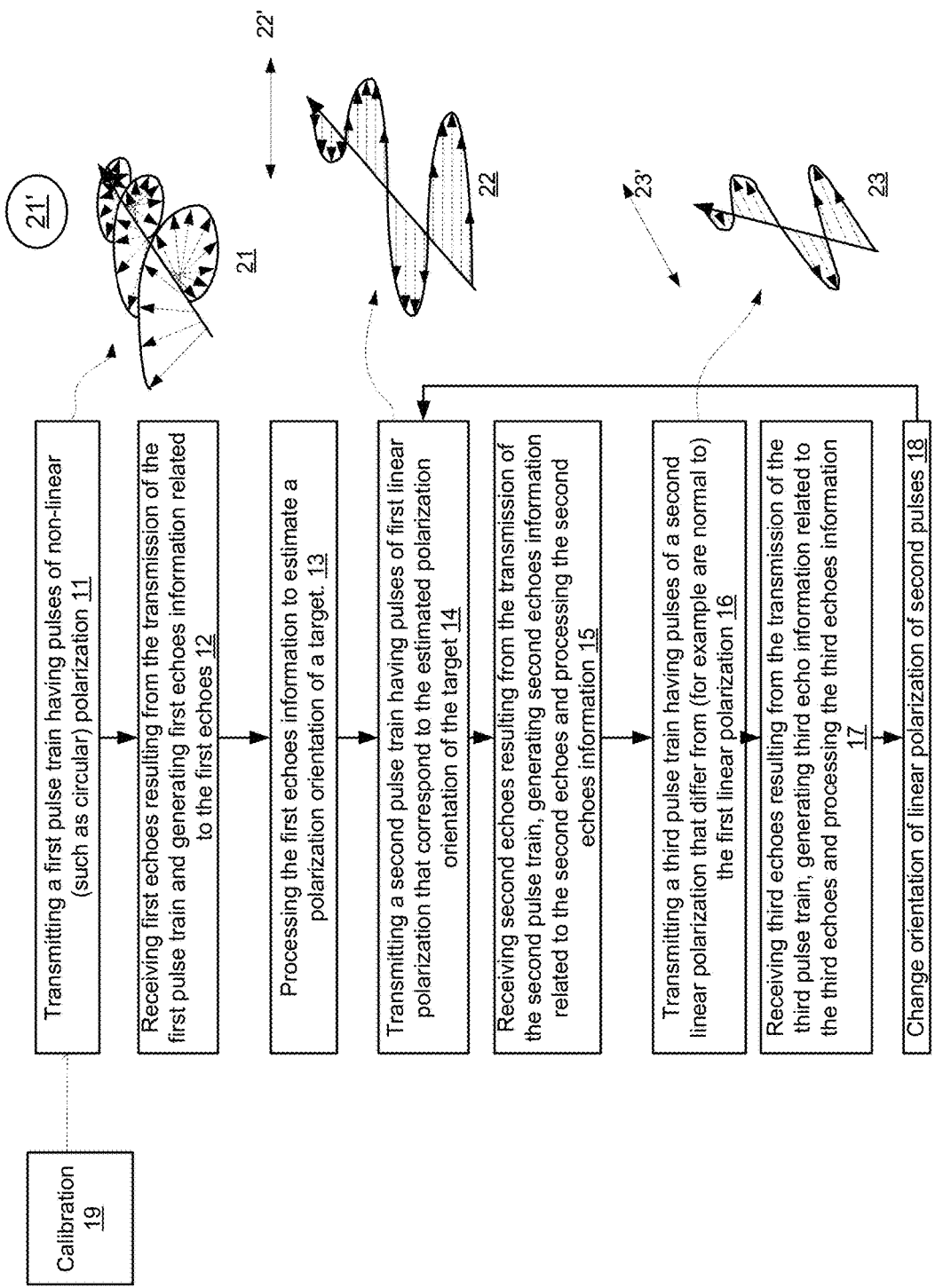
FIG. 1 illustrates a method according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and to non-transitory computer readable medium that stores instruction for executing such method.

Any reference in the specification to a system should be applied mutatis mutandis to a method that may be executed by the system and to non-transitory computer readable medium that stores instruction for executing such method.

According to an embodiment of the invention there is provided a method that starts with a first phase that includes transmitting circular polarization or elliptical polarization that approximates circular polarization. When a target is detected the polarization of the received signal is estimated using the proposed polarization test. During a second phase a first pair of parallel polarization waves and orthogonal polarizations waves are transmitted. The parallel polarization waves are linearly-polarized waves parallel to the estimated polarization of the target (as was derived from the proposed polarization test). The orthogonal polarization waves are linearly-polarized waves perpendicular to this polarization. The polarizations of the parallel polarization waves and of the orthogonal polarization waves are slightly rotated to provide a next pair of waves that are transmitted towards the target, this is followed by processing the received signals. The rotation, transmission and estimation are continued until a maximal power is received for the parallel transmit and minimal for the orthogonal transmit.

In the following example it is assumed that during the first phase circular polarization waves are transmitted.

For example, using linearly polarized antennas (might be dipole, or slot, or other). A transmitter may power split a pulse train of multiple (N) pulses to two pulse trains and send the two pulse trains to two linearly polarized antennas that are orthogonal to each other.

If both pulse trains are fed to the linearly polarized antennas with the same phase the result is (ideally) linear polarization with an angle which is a function of gains of the different paths through which the two pulse trains propagate. Introducing a phase difference of ninety degrees between the pulse trains but maintaining a same gain results in a circular polarization. Introducing both a phase shift and a gain shift between the two pulse trains results in an elliptical polarization.

It is further noted that the transmit antenna may include a transmit antenna that is structured to have a single port and emit circular polarization constantly.

The receive antennas and/or components of a receiver (for example filters) may differentiate between different spectral components of the echoes.

According to an embodiment of the invention all pulses of a one pulse train are transmitted using a certain polarization and all pulses of the following pulse train are transmitted using another polarization. Thus, different groups of pulses of a single pulse train are transmitted using different polarizations. A group of pulses of the same polarization may include consecutive and/or non-consecutive pulses.

Once linearly polarized return wave is detected by the system, the system estimates its polarization orientation and transmits a linearly-polarized pulse train wave with the same angle, denoted hereafter "oriented polarization".

The system may also transmit a counterpart pulse train which is ninety degrees perpendicular denoted "Disoriented polarization". The objective is to receive maximum reflection in the co-oriented polarization and minimum reflection at the cross-orientation polarization.

To fine-tune the estimation of the polarization orientation, the system rotates the transmitted linearly-polarized wave around the estimated angle until the objective is met.

The transmission of pulses may be done in a way that the samples of the received signals are stored in a way that the analysis stage can be done separately on samples belong to the "oriented polarized" transmitted pulses and on samples belong to the "disoriented polarized" transmitted pulses.

This can be done alternately, such that N pulses with "oriented polarization" are transmitted, received and processed to detect targets and their polarization ratio, and then N pulses with "disoriented polarization" are transmitted, received and processed and so forth.

Alternatively, the transceiver may transmit a single pulse with "oriented polarization" followed by a single pulse with "disoriented polarization" and the returns are stored in separate arrays. This is done N times after which two arrays, each contains N vectors of length K are obtained, one for the "oriented polarized" Tx and one for the "disoriented polarized" Tx.

According to an embodiment of the invention the system may be configured to differentiate between different polarization components of the echoes and to provide information about each of these different polarization components. Thus, a transmission of a single train of pulses that has at least two polarization components that match the different polarization components differentiated by the system may be transmitted. The differentiation may be done by using antennas that are capable of receiving different polarization components and/or applying polarization selective operations (using filters) following the antenna. This information may be used during the polarization test.

The pulse train analysis is performed on each array separately, and the polarization test uses both arrays.

FIG. 1 includes a calibration process 19 during which the channel response of the transmission and reception channels are estimated.

Before operation, or as part of a recurrent procedure, the method measures the (normalized) distortion vector t (belongs to $C^2$) and the matrix R (belongs to $C^2$) of the system, which reflect the transfer function of the transmission channel and the receive channel respectively. Note that the (normalized) distortion vector t shall often be measured for different polarizations separately.

For example, the method may use a calibrator which is built on a reference antenna (such as dipole antenna) and an electronically equalized Tx and Rx channels. The reference dipole is designed to give known polarization purity which is at least a certain amount (for example 6 dB) better than the maximal performance required from the system.

The Tx and Rx channels are equalized using an RF signal generator and scopes which give at least 10 times better accuracy than is required from the system.

The calibration may be done in two stages:

For t: the system transmits a periodic known coded pulse (e.g., 0/1) through the Tx ports of the system, and measures the received signal in the calibrator. Comparing the intensity and the phase of the received signals while transmitting from each of the two ports (Horizontal polarization and Vertical polarization) of the system gives t.

For R: the system transmits from the calibrator a signal with known polarization using the reference dipole antenna which is tilted at a known angle about the horizon. The system receives the signals through the H and V ports of the system for transmitting H-polarized wave from the dipole and while transmitting V-polarized wave from the dipole. From the intensity and the phase of the 4 received signals, we extract R.

FIG. 1 illustrates method 10 for detecting a polarization orientation of an object (which is a potential obstacle) according to an embodiment of the invention. FIG. 1 also illustrates first pulses 21 of a first pulse train of circular polarization (circle 21' represents the circular polarization), second pulses 22 of a second pulse train of a first linear polarization (oriented polarization) reflecting an estimated polarization orientation of a target (arrow 22' represents the estimated polarization orientation), and third pulses 23 of a third pulse train of a second linear polarization (disoriented polarization) that is oriented to the second polarization (arrow 23').

Method 10 includes a sequence of stages 11, 12, 13, 14, 15, 16 and 17. Method 10 may also include stage 18 that is followed by stage 14. Method 10 may also include calibration stage 19 that is followed by stage 11.

Stage 11 may include transmitting a first pulse train having pulses of circular polarization.

Stage 12 may include receiving first echoes resulting from the transmission of the first pulse train and generating first echoes information related to the first echoes.

Stage 13 may include processing the first echoes information to estimate a polarization orientation of a target.

Stage 14 may include transmitting a second pulse train having pulses of a first linear polarization that correspond to the estimated polarization orientation of the target.

Stage 15 may include receiving second echoes resulting from the transmission of the second pulse train, generating second echoes information related to the second echoes and processing the second echoes information.

Stage 16 may include transmitting a third pulse train having pulses of a second linear polarization that differ from (for example are normal to) the first linear polarization.

Stage 17 may include receiving third echoes resulting from the transmission of the third pulse train, generating third echo information related to the third echoes and processing the second echoes information.

Stage 18 may include changing orientation of the linear polarization of the second pulses. This may be performed during the fine-tuning of the estimation of the polarization orientation of the target. Stage 18 may be followed by stage 14.

It is noted that stage 13 may be unconditionally followed by stage 14. It is further noted that stage 13 may be followed by stage 14 only if stage 13 is indicative that the target is endowed with a distinguished linearly-polarized return.

Figure 2:
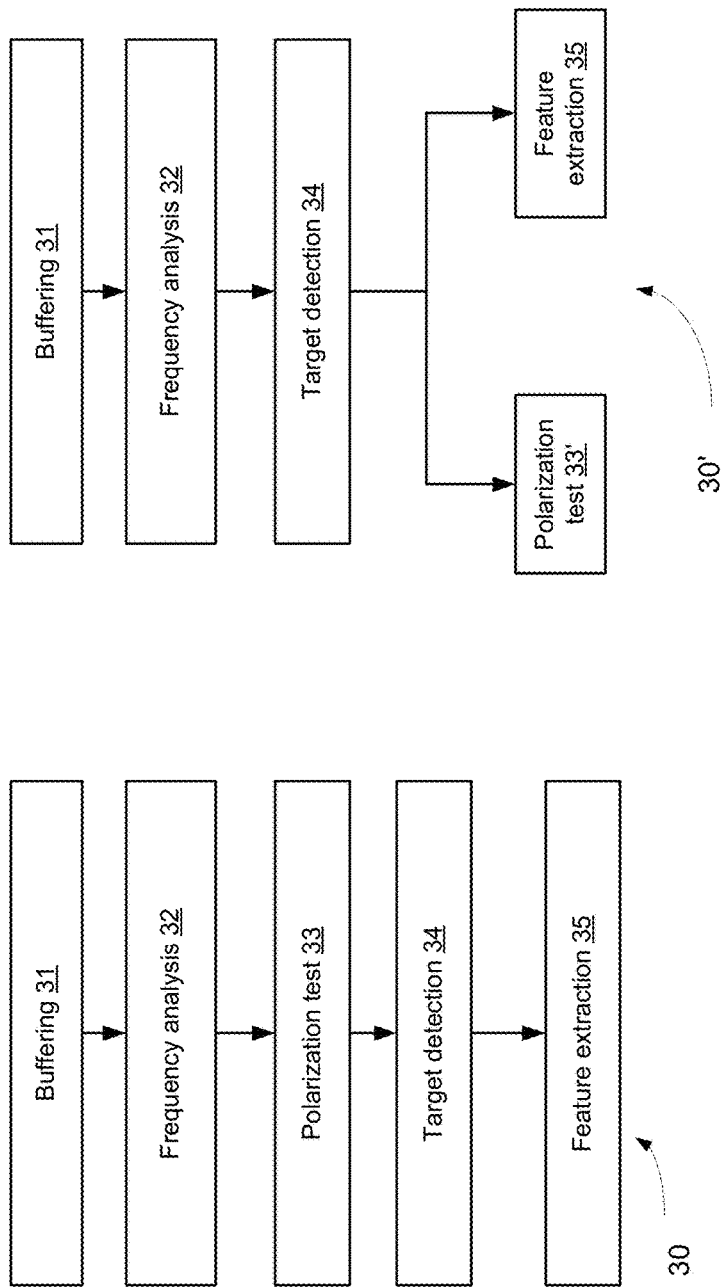
FIG. 2 illustrates a method according to an embodiment of the invention.

FIG. 2 illustrates two methods 30 and 30' according to an embodiment of the invention.

Methods 30 and 30' differ from each other by the order of stages and also by the content of their polarization test.

In method 30 a buffering 31 precedes a frequency analysis 32 which is followed by a polarization test 33. The polarization test 33 is applied on each range-Doppler bin (because targets were not detected yet)—and on potential targets (if such exist). The polarization test 33 is followed by a target detection 34 that precedes feature extraction 35.

In method 30' the target detection 34 precedes the polarization test 33' and the feature extraction 35. The polarization test 33' may be applied only on range-Doppler bits in which targets were detected.

Methods 30 and 30' start by stage 31 of buffering the detection signals. A group of echoes of a certain pulse train of N pulses may be represented by a set of (N×K) detection signals. Each echo may be represented by K detection signals, that represent K echo intensities and K phase values that were received at K points in time that differ from each other.

Assuming that multiple (such as two) different polarization components are received, each group of echoes may be represented by K detection signals. Each detection signal represents the different polarization components of each echo.

Alternatively, different polarization components may be represented by a plurality of detection signals per range Doppler bin and the group of echoes will be represented by a plurality of sets of N×K detection signals.

According to an embodiment of the invention echoes returned up to the PRI (pulse rate interval) equivalent range, $R_{max}$ are received and stored in a complex-valued vector denoted, for example by V, of length $K = R_{max}/\text{DeltaR}$ where DeltaR is the resolution in range.

Here $R_{max} = c \cdot T/2$, where T is the PRI and $1/T$ the PRF and c is the velocity of propagation. In other words, the vector V contains K elements indexed by $k=0, \ldots, K-1$, so that each element represents a range bin of length DeltaR.

The echoes in each $k^{th}$ range bin, are stored in a complex-valued form, say Cartesian format (I/Q) or polar format (phase/magnitude). The magnitude of the $k^{th}$ element of the vector V reflects the echo intensity from target at range $k \cdot \text{DeltaR}$. The phase of the $k^{th}$ element of the vector V will be $4\text{Pi} \cdot (k \cdot \text{DeltaR})/\text{Lambda}_0$ where $\text{Lambda}_0$ is the wavelength of the carrier frequency $f_0$, that is, $\text{Lambda}_0 = c/f_0$. Since $k \cdot \text{DeltaR}$ may be typically many times $\text{Lambda}_0$, the phase which is registered is the residue, modulo $2\text{Pi}$ of the real phase.

The process is repeated N times for all of the N pulses in each pulse train to complete one cycle of buffering. Namely, for each transmitted pulse, another (I,Q) vector is recorded.

Using dual-polarized antenna (or any other multiple polarization component distinctive receiver), the method performs the above simultaneously for each one of the two ports (or multiple polarization components), so that we have a complex-valued matrix of size K×N for each port (for each of the multiple polarization components). Alternatively, elements of a matrix may represent values of more than a single polarization component.

The detection signals may be then processed, according to method 30 or 30', by applying a frequency analysis (stage 32). For each range bin $k=0, \ldots, K-1$, a frequency analysis is performed, e.g., an ordinary N-point complex discrete Fourier-Transform (DFT), with or without zero-padding and/or windowing, allowing for the DeltaR range-Doppler bin to be sub-divided into N resolvable Doppler bins.

Target detection (stage 34 of method 30') is performed on the range-Doppler map, which is a matrix of K×N, whose (complex) (k,n) element represents the intensity and the phase of an echo from a target in the k-th range bin and in the n-th Doppler bin. (index n ranges between 0 and N−1).

Target detection might be based on constant false alarm rate (CFAR). The role of CFAR is to determine the power threshold above which any return can be considered to probably originate from a target. Other detection methods, based on features other than the intensity of the echo, might be used as well.

In method 30' the target detection (stage 34) may be followed by a polarization test 33' wherein in method 30 the polarization test 33 precedes the target detection. In both cases the method may include an extraction of other features (stage 35).

Figure 3:
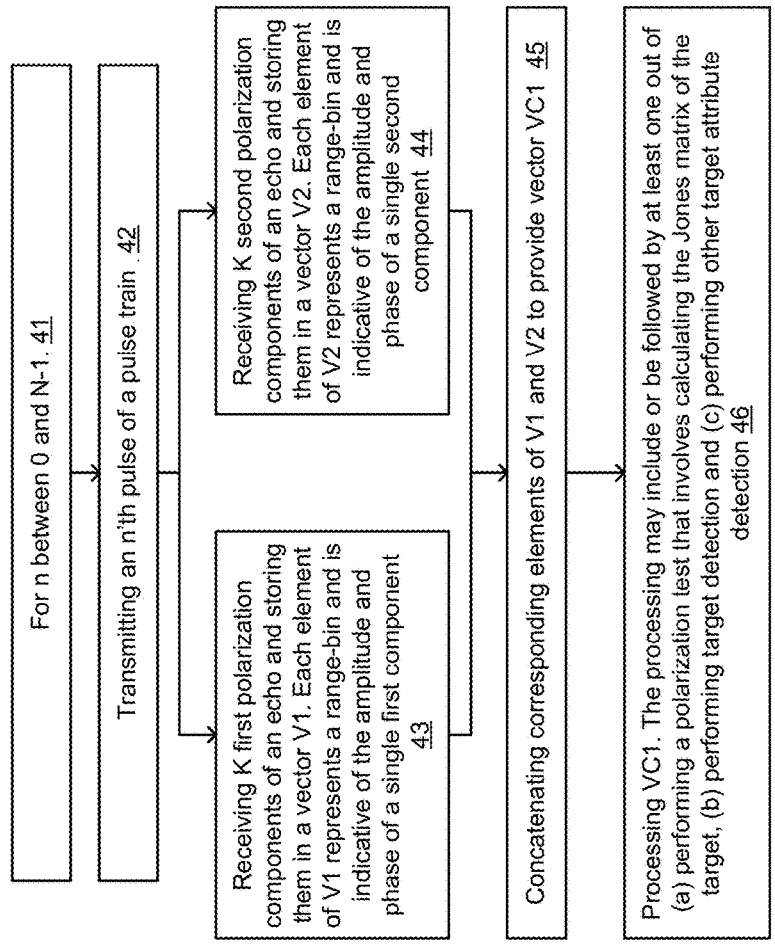
FIG. 3 illustrates a method according to an embodiment of the invention.

FIG. 3 illustrates a method 40 according to an embodiment of the invention.

It is assumed that the method receives a pair of range-Doppler components of each echo and that each pulse train includes N pulses.

Method 40 starts by control stage 41—for n between 0 and N−1.

Stage 41 is followed by stage 42 of transmitting the n'th pulse of the pulse train.

Stage 42 is followed by stages 43 and 44.

Stage 43 includes receiving K first polarization components of an echo and storing them in a vector V1. Each element of V1 represents a range-Doppler bin and is indicative of the amplitude and phase of a single first component.

Stage 44 includes receiving K second polarization components of an echo and storing them in a vector V2. Each element of V2 represents a range-Doppler bin and is indicative of the amplitude and phase of a single second component.

Stages 43 and 44 are followed by stage 45 of concatenating corresponding elements of V1 and V2 to provide vector VC1. It is noted that stage 45 may include creating VC1 in response to V1 and V2 by applying any function.

Stage 45 may be followed by stage 46 of processing VC1.

The processing (stage 46) may be included in, may be followed by or may precede at least one out of (a) performing a polarization test that involves calculating the Jones matrix of the target, (b) performing target detection and (c) performing other target attribute detection.

Figure 4:
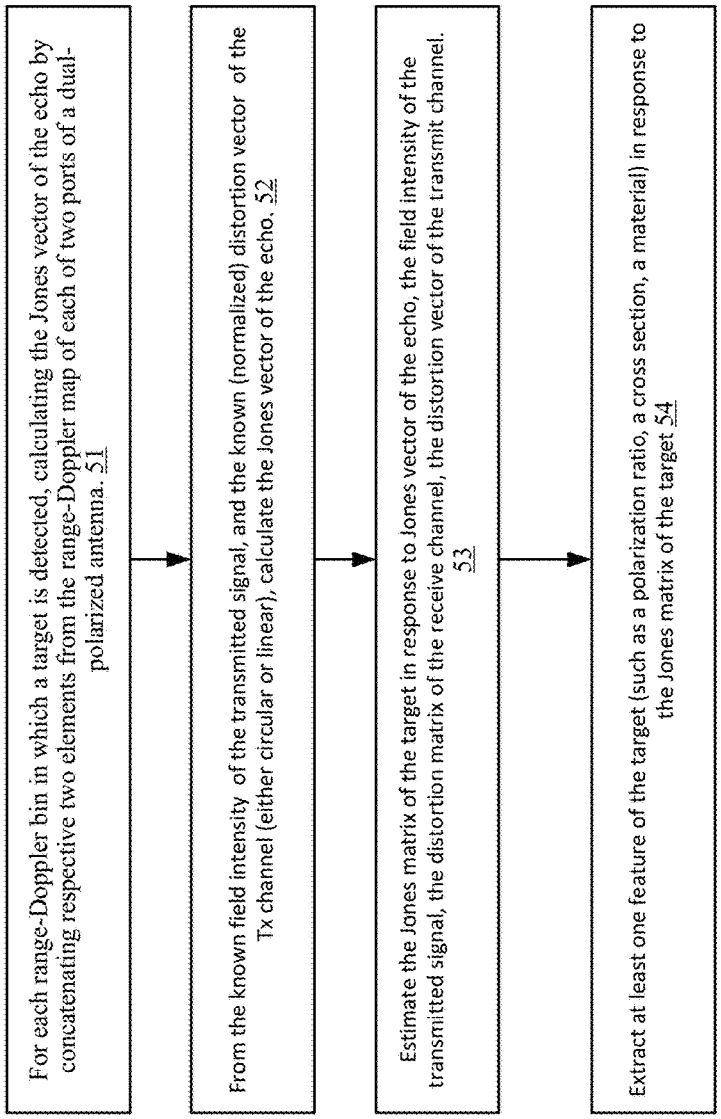
FIG. 4 illustrates a method according to an embodiment of the invention.

FIG. 4 illustrates a method 50 according to an embodiment of the invention.

It is assumed that the method receives a pair of range-Doppler components of each echo and that each pulse train includes N pulses. It is assumed that method 50 is preceded by (or includes) a calibration stage (not shown) such as calibration stage 19 of FIG. 1.

Method 50 includes a sequence of stages 51, 52, 53 and 54.

Stage 51 may include calculating, for each range bin in which a target is detected, the Jones vector of the echo by concatenating respective two elements from the range-Doppler map of each of two ports of a dual-polarized antenna (two range-Doppler components).

Stage 52 may include calculating, from the known field intensity of the transmitted signal, and the known (normalized) distortion vector t of the Tx channel (either circular or linear), the Jones vector of the echo.

Stage 53 may include estimating the Jones matrix of the target in response to the Jones vector of the echo, the field intensity of the transmitted signal, the distortion matrix of the receive channel, the distortion vector of the transmit channel.

Stage 54 may include extracting at least one feature of the target (such as a polarization ratio, a cross section, a material) in response to the Jones matrix of the target.

Figure 5:
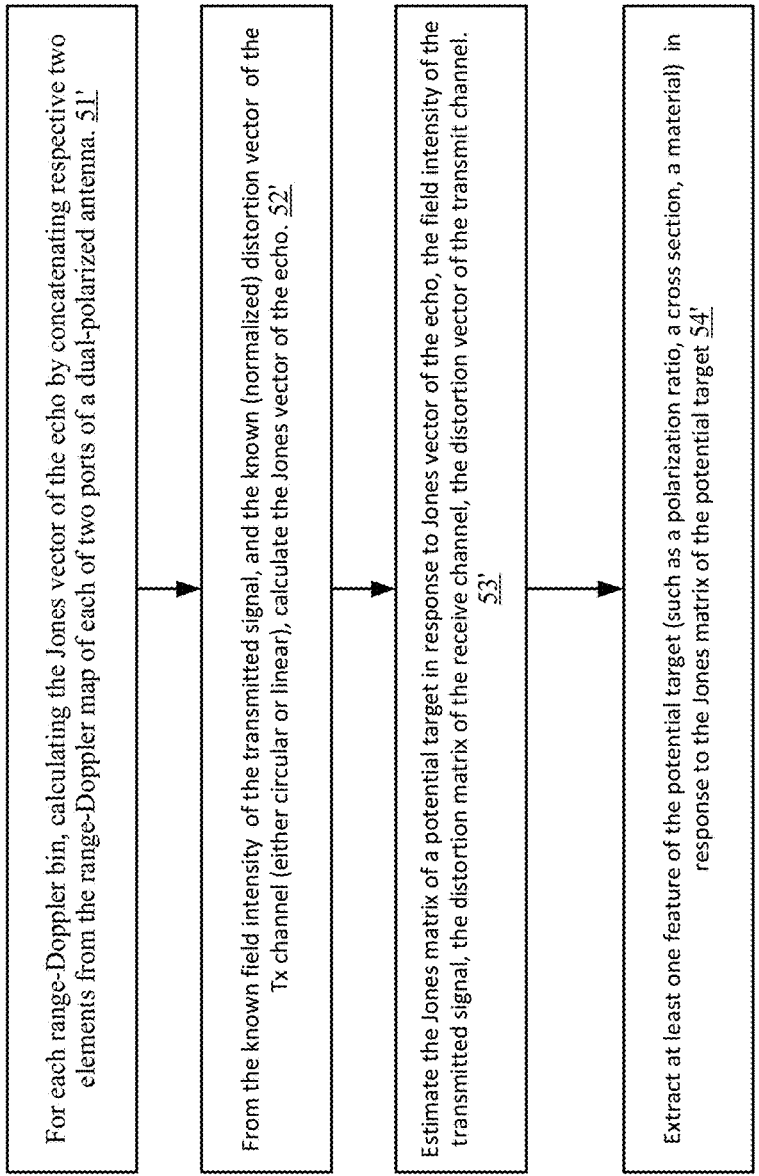
FIG. 5 illustrates a method according to an embodiment of the invention.

FIG. 5 illustrates a method 50' according to an embodiment of the invention.

It is assumed that the method receives a pair of range-Doppler components of each echo and that each pulse train includes N pulses. It is assumed that method 50' is preceded by (or includes) a calibration stage (not shown) such as calibration stage 19 of FIG. 1.

Method 50' includes a sequence of stages 51', 52', 53' and 54'.

Stage 51' may include calculating, for each range bin the Jones vector of the echo by concatenating respective two elements from the range-Doppler map of each of two ports of a dual-polarized antenna (two range-Doppler components).

Stage 52' may include calculating, from the known field intensity of the transmitted signal, and the known (normalized) distortion vector t of the Tx channel (either circular or linear), the Jones vector of the echo.

Stage 53' may include estimating the Jones matrix of each potential target in response to Jones vector of the echo, the field intensity of the transmitted signal, the distortion matrix of the receive channel, the distortion vector of the transmit channel.

Stage 54' may include extracting at least one feature of the potential target (such as a polarization ratio, a cross section, a material) in response to the Jones matrix of the potential target.

Methods 30, 30', 40, 50, and 50' may be repeated every time echoes resulting from a transmission of a pulse train are received. Referring to method 10, these methods may be included in stages 12 and 13, and in stages 15 and 17.

Figure 6:
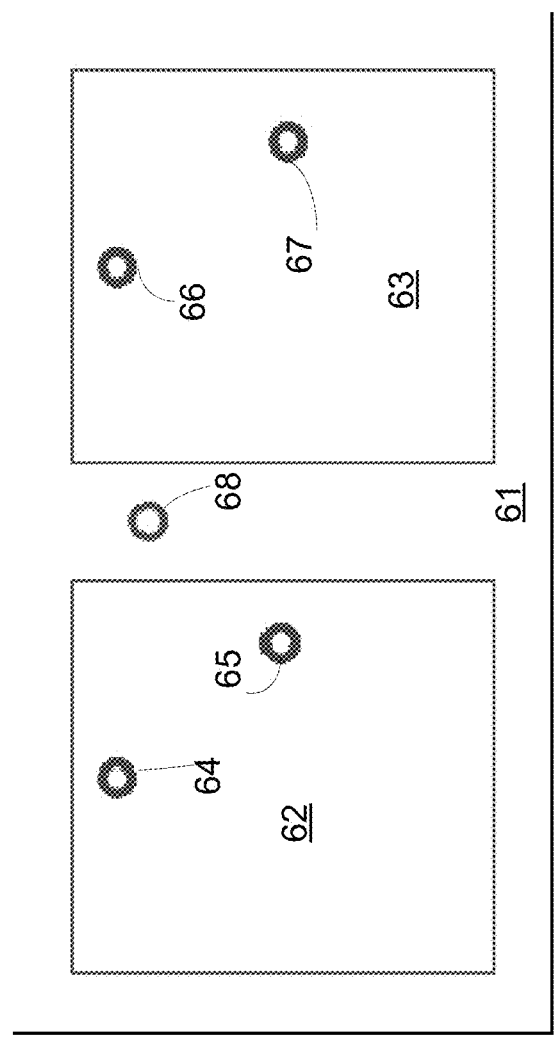
FIG. 6 illustrates an antenna according to an embodiment of the invention.

FIG. 6 illustrates a dual port path antenna 60 according to an embodiment of the invention.

The dual port path antenna 60 is used for transmission and reception. It includes a feeding port 68 and four ports 64, 65, 66 and 67. Ports 64 and 65 belong to a first patch 62 of antenna 60 and ports 66 and 67 belong to the second patch of the antenna 60.

It is noted that feeding port 68 is a feed for calibration purpose. A signal is provided to feeding port 68 and received signals in reception ports 64, 65, 66 and 67 are measured. Ports 64-67 may be used for reception and/or transmission. Injection of two identical signals simultaneously to ports 64-67 will cause the antenna to transmit. Injecting identical signals to ports 64 and 65 will cause the antenna to transmit a linear polarized wave of 45 degrees.

For example—for a wavelength=306 mm, the Overall size of the antenna=370 mm×170 mm=1.21 Lambda×0.55 Lambda, each one of the two patches 62 and 63 is 127 mm×127 mm=0.42 Lambda×0.42 Lambda, the distance between ports 66 and 64 is 200 mm=0.65 Lambda, the distance between the patches is 73 mm=0.24 Lambda, the distance between a patch edge to ground edge of the antenna (leftmost and rightmost edges)=21.5 mm=3.5× substrate, total thickness of the antenna=11 mm=0.036 Lambda.

Any combination of dipole antennas that are oriented to each other may provide linear polarizations of oriented polarization orientation.

Figure 7:
FIG. 7 illustrates a method according to an embodiment of the invention.

FIG. 7 illustrates a method 100 according to an embodiment of the invention.

Method 100 may include at least some of the following stages 101-113:
  a. Calculating distortion parameters of the system and/or the receive and/or transmit channel.
  b. Transmitting a first pulse train that may include multiple radio frequency (RF) pulses of a first non-linear polarity.

c. Receiving first echoes resulting from the transmission of the first pulse train.
d. Generating first detection signals that represent the first echoes.
e. Processing the first detection signals. The first detection signals may include different polarization components and the processing may include performing a polarization test that involves calculating the Jones matrix of the target.
f. Transmitting a second pulse train that may include multiple RF pulses of a linear polarity of a first polarization orientation that approximates the estimated polarization orientation of the target.
g. Receiving second echoes resulting from the transmission of the second pulse train.
h. Generating second detection signals that represent the second echoes;
i. Processing the second detection signals. For example—verifying the estimated polarization orientation.
j. Transmitting a third pulse train that may include multiple RF pulses of a linear polarity of a second polarization orientation that is oriented to the estimated polarization orientation of the target.
k. Receiving third echoes resulting from the transmission of the third pulse train
l. Generating third detection signals that represent the third echoes.
m. Processing the third detection signals. For example—verifying the estimated polarization orientation of the target.

Polarization of waves is a powerful tool to distinguish radar targets from clutter and from other targets through polarization ratio test. In the context of obstacle detection radar, the radar exploits the polarization property of radio frequency (RF) waves to distinguish obstacles having a prominent aspect ratio, e.g., wires and pylons, from other obstacles, e.g., buildings and terrain features, and from clutter.

The polarization ratio test is often based on comparing the polarization of received signals from two or more antennas, and interpreting the result in the light of the polarization of the transmitted polarization if it is known. Therefore, the polarization test often involves the transmit (Tx) and receive (Rx) operations of the radar, and the physical properties of the targets. Furthermore, the polarization ratio test performance is highly dependent on the accuracy of the estimation of the polarization ratio between the received signals.

There is illustrated a Tx and Rx routine which facilitates the polarization ratio, and the method to estimate the polarization ratio between the received signals. For the sake of simplicity, we shall restrict the discussion to the case of constant frequency across the physical and the electronic channels.

An electromagnetic (EM) wave is composed of electric (E) and magnetic (B) field components. These components are always perpendicular to each other and also to the direction of propagation of the EM wave. The electric field is defined, as any observable quantity, by the real part of the complex electric field:

$$E_A(r,t) = E_B \cdot e^{j(k \cdot z + \omega t)} \in \mathbb{C}^2 \quad (1)$$

Where $r$ is the position vector, whose components are the x,y,z coordinates, and $E_B$, which is the base-band equivalent, is composed of its components in the x-y plane, that is, $E_B = [E_x, E_y]^T \in \mathbb{C}^2$. In other words, the complex electric field is the analytic equivalent of the observable electric field:

$$E(r,t) = Re\{E_B \cdot e^{j(k \cdot z + \omega t)}\} = E_I \cos(k \cdot z + \omega t) - E_Q \sin(k \cdot z + \omega t) \in \mathbb{C}^2 \quad (2)$$

Where $E_B = E_I + j \cdot E_Q \in \mathbb{C}^2$, or alternatively $$E(r,t) = |E_B| \cos(k \cdot z + \omega t + \angle E_B) \in \mathbb{C}^2 \quad (3)$$

When $E_B$ is a deterministic factor, we say that the wave is fully-polarized. When $E_B$ is a random variable, we say that the wave is partially- or non-polarized.

Figure 8:
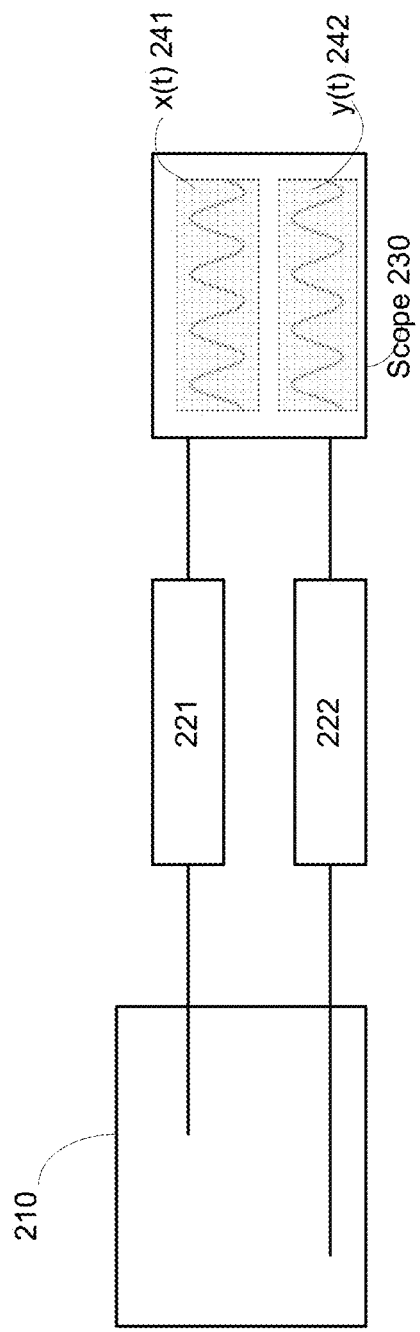
FIG. 8 illustrates a dual polarization antenna according to an embodiment of the invention.

Assume for example the following block diagram of a dual-polarized receiver (see FIG. 8), consisting of dual polarized antenna 210, RF receiver having two reception paths 221 and 222 and scope 230. Assume that the receiver at this stage does not change the carrier frequency. Also assume that the dual-polarized antenna is an ideal one, so that the port denoted 'X' provides the x-component only of the received signal and the port denoted by 'Y' provides the y-component only of the received signal. Evidently, the scope might show the x- and the y-components of the projection of E(r, t) on the x-y plane.

If the received signal is a single-tone fully-polarized sine wave, namely $|E_B|$ and $\angle E_B$ are deterministic constants, the signals on the scope would be, up to common phase which cannot be observed on a scope:

$$x(t) = |E_x| \cos(\omega t + \angle E_x) \in \mathbb{R}$$

$$y(t) = |E_y| \cos(\omega t + \angle E_y) \in \mathbb{R} \quad (4)$$

These signals x(t) and y(t) are shown on scope 230 and are denoted x(t) 241 and y(t) 242.

Because the objective phase of each signal cannot be measured, and only the phase between the two signals can be measured, let's define the phase difference between the two channels to be:

$$\phi \triangleq \angle E_y - \angle E_x \quad (5)$$

Figure 9:
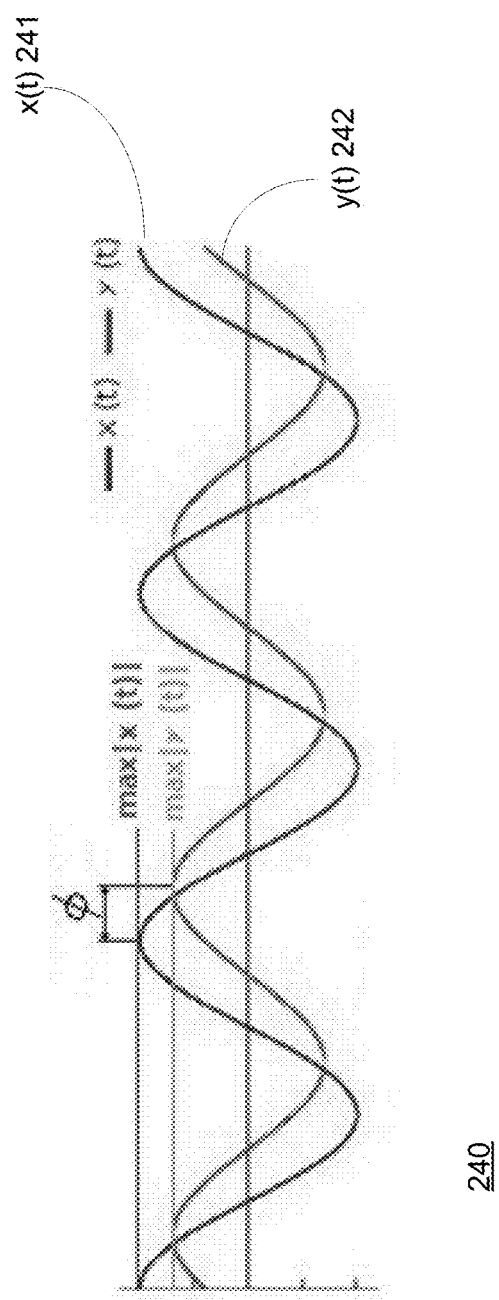
FIG. 9 illustrates various signals according to an embodiment of the invention.

FIG. 9 exemplifies a typical plot of x(t) 241 and y(t) 242 on the scope. Note that max $(|x(t)|) = |E_x|$ and max$(|y(t)|) = |E_y|$.

Polarization Ellipse

The received signals in the previous example can be plotted on the scope using an x-y plot. In the case of a fully polarized wave, the curve has the geometrical meaning of an ellipse, also termed polarization ellipse, which is a generalization of line (zero minor axis), circle (equal minor and major axes) and ellipse (general major to minor axis ratio). In the case of a partially- or non-polarized case, which is beyond the scope of this manuscript, the plot would show a "stochastic cloud" in the x-y plane.

Figure 10:
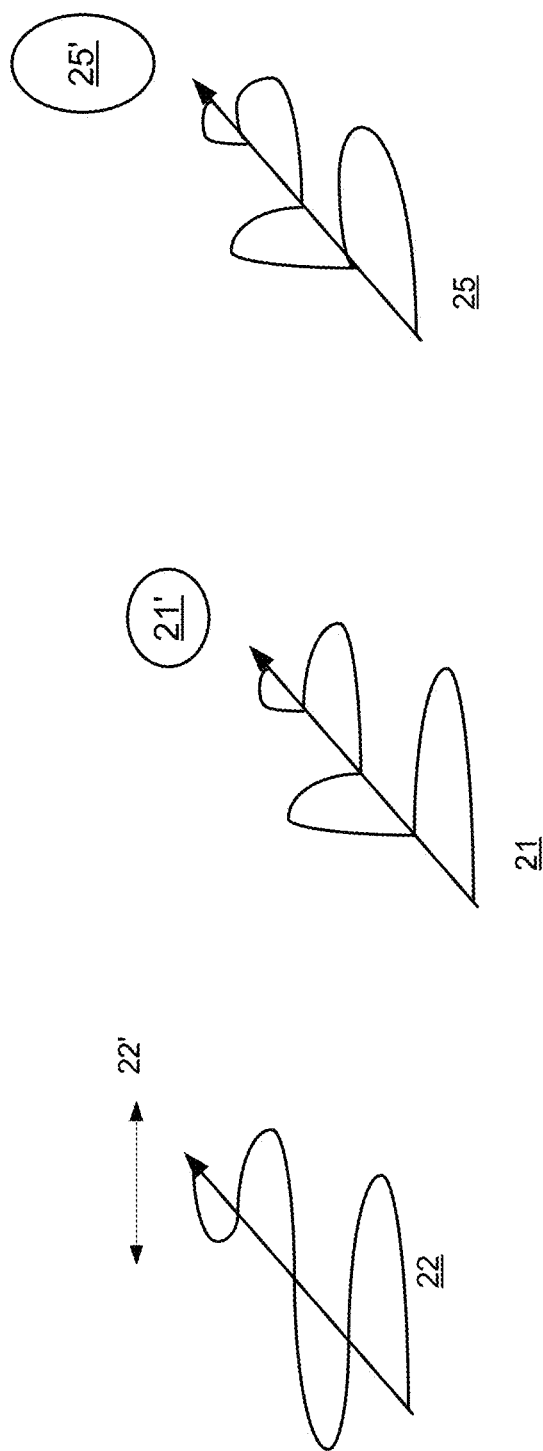
FIG. 10 illustrates various polarizations.

FIG. 10 illustrates Linearly-polarized wave 22 and wavefront 22', circularly polarized wave 21 and wavefront 21' and elliptically-polarized wave 25 and wavefront 25'.

The polarization characteristic of a fully-polarized wave, either linear, circular or elliptic, can be extracted from either x-y plot or the x(t) and y(t) plot. In other words, the wave is fully characterized by the properties of the polarization ellipse, namely the half-length of the major and minor axes, denoted by a,b≥0 respectively, and the angle between the major axis and the $x$ axis, denoted by $-\pi/2 \leq \varphi \leq \pi/2$, and termed the polarization orientation hereinafter (see FIG. 11).

Figure 11:
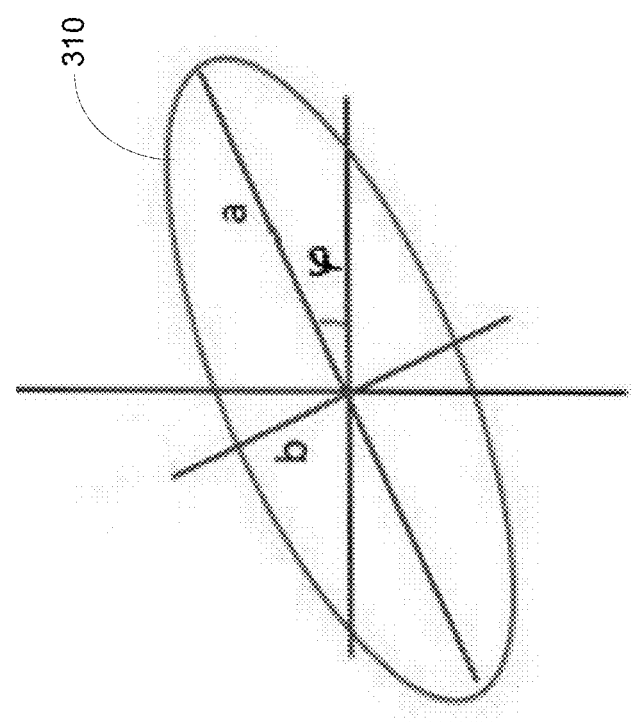
FIG. 11 illustrates a polarization ellipse according to an embodiment of the invention.

FIG. 11 illustrates the ellipse 310 and its parameters in x-y mode, and is supplementary to the parametric representation in time in FIG. 9.

The relation between the parameters of the polarization ellipse—a,b,φ—and the parameters of the received signals in time x(t), y(t)—$|E_x|$, $|E_y|$, φ—are:

$$a = \frac{P+Q}{2}, b = \frac{P-Q}{2}, \varphi = \frac{1}{2} \cdot \cos^{-1}\left(\frac{|E_x|^2 - |E_y|^2}{P \cdot Q}\right) \quad (6)$$

Where $$P\sqrt{|E_x|^2 + |E_y|^2 + 2|E_x||E_y|\sin(\phi)}, \quad (7)$$
$$Q\sqrt{|E_x|^2 + |E_y|^2 - 2|E_x||E_y|\sin(\phi)}$$

Estimation of the Polarization Ratio

Extracting the target features is greatly dependent on the accuracy of estimating the Jones vector of the received signal. In the radar Rx channel, the parameters of the polarization ellipse cannot be measured directly, as the Rx channel uses dual-polarized patch antenna, which gives only the Jones vector's elements in time.

Recall, that Equations express the ellipse parameters $a,b,\phi$ as a function of $|E_x|, |E_y|, \phi$.

The Rx channel measures directly only the amplitudes ratio between the signals received from the x-port and the y-port, which is defined as:

$$\rho \frac{|E_y|}{|E_x|} \in \quad (7)$$

This is because the implicit values depend on unknown parameters such as the distance and the target material. Note also, that only the phase difference $\phi E_y - E_x \in$ is measured because the implicit phase of a signal has no meaning. The problem is that we have only 2 equations with 3 unknowns. The remedy is to estimate only the ratio between the ellipse axes:

$$\gamma \frac{a}{b} \quad (8)$$

This can be easily justified because the Jones vector is often normalized to unit norm while omitting the implicit gains.

Substituting Equations (6)-(7) in Equation (8) gives:

$$\gamma = \frac{P+Q}{P-Q} = \frac{\sqrt{1+\rho^2 + 2\rho\sin(\phi)} + \sqrt{1+\rho^2 - 2\rho\sin(\phi)}}{\sqrt{1+\rho^2 + 2\rho\sin(\phi)} - \sqrt{1+\rho^2 - 2\rho\sin(\phi)}} \quad (9)$$

And from Equations (6)-(7), we have:

$$\hat{\varphi}_1 = \frac{1}{2} \cdot \cos^{-1}\left(\frac{1-\rho^2}{\sqrt{1+\rho^2+2\rho\sin(\phi)} \cdot \sqrt{1+\rho^2-2\rho\sin(\phi)}}\right) \quad (10)$$

According to an embodiment of the invention there may be provided a system for detecting a target, the system may include a transceiver and a signal processor. The transceiver that is configured to transmit a first pulse train that comprises multiple radio frequency (RF) pulses of a first non-linear polarity; receives, by a multiple polarization antenna, first echoes resulting from the transmission of the first pulse train; generates first detection signals that represent first polarization components of the first echoes; generates second detection signals that represents second polarization components of the first echoes; wherein the first polarization components are associated with a first polarization; wherein the second polarization components are associated with a second polarization that differs from the first polarization; wherein the signal processor is configured to process the first detection signals to provide an estimated polarization orientation of a target, in response to (a) a ratio between (i) intensities of the first polarization components and (ii) intensities of the second polarization components, and in response to (b) phase differences between the first and second polarization components. The first and second polarization components are received during a reception window.

ρ is a ratio between an average of an absolute value of intensities of the first polarization components and an average of an absolute value of intensities of the second polarization components, and wherein ∅ is an average of the phase differences between the first and second polarization components; wherein the estimated polarization orientation of a target equals:

$$\frac{1}{2} * \arccos\left(\frac{(1-\rho^2)}{\sqrt{(1+\rho^2+2\rho\sin(\emptyset))} * \sqrt{(1+\rho^2-2\rho\sin(\emptyset))}}\right)$$

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A system for detecting a target, the system comprises a transceiver and a signal processor;
   wherein the transceiver is configured to:
   transmit a first pulse train that comprises multiple radio frequency (RF) pulses of a first non-linear polarity;
   receive first echoes resulting from the transmission of the first pulse train;
   generate first detection signals that represent the first echoes;
   wherein the signal processor is configured to process the first detection signals to provide an estimated polarization orientation of a target; wherein the processing of the first detection signals comprises estimating a Jones matrix of the target.

2. The system according to claim 1 wherein the first detection signals represent different polarization components of the first echoes.

3. The system according to claim 1 wherein the transceiver is further configured to:
   transmit a second pulse train that comprises multiple radio frequency (RF) pulses of a linear polarity of a first polarization orientation that approximates the estimated polarization orientation of the target;
   receive second echoes resulting from the transmission of the second pulse train; and
   generate second detection signals that represent the second echoes; and wherein the signal processor is further configured to process the second detection signals.

4. The system according to claim 3 wherein the second detection signals represent different polarization components of the first echoes.

5. The system according to claim 3 wherein the signal processor is configured to process the second detection signals to verify the estimated polarization of the target.

6. The system according to claim 3 wherein the transceiver is further configured to:
   transmit a third pulse train that comprises multiple radio frequency (RF) pulses of a linear polarity of a second polarization orientation that is oriented to the estimated polarization orientation of the target;
   receive third echoes resulting from the transmission of the third pulse train; and
   generate third detection signals that represent the third echoes; and
   wherein the signal processor is further configured to process the third detection signals to verify the estimated polarization orientation of the target.

7. The system according to claim 6 wherein the third detection signals represent different polarization components of the third echoes.

8. The system according to claim 6 wherein the second polarization orientation is normal to the estimated polarization orientation of the target.

9. The system according to claim 1 wherein the first non-linear polarization is a circular polarization.

10. The system according to claim 1 that is configured to calculate distortion parameters of the system; wherein the estimating of the Jones matrix of the target is responsive to the distortion parameters of the target.

11. The system according to claim 1 wherein the transceiver is configured to generate a first set of detection signals for each first echo, wherein the first set of detection signals represents multiple first echo intensity and phase values that were received at different points in time.

12. The system according to claim 11 wherein the signal processor is configured to apply a frequency analysis of first sets of detection signals that are associated with each of the first echoes to provide a frequency analysis result.

13. The system according to claim 12 wherein the signal processor is configured to perform a target detection process and a polarization test in response to the frequency analysis result.

14. The system according to claim 12 wherein the frequency analysis comprises performing a discrete Fourier transform.

15. The system according to claim 1 that is configured to estimate a ratio between complex components of polarization axes of received signals.

16. A system for detecting a target, the system comprises a transceiver and a signal processor;
   wherein the transceiver is configured to:
   transmit a first pulse train that comprises multiple radio frequency (RF) pulses of a first non-linear polarity;
   receive, by a multiple polarization antenna, first echoes resulting from the transmission of the first pulse train;
   generate first detection signals that represent first polarization components of the first echoes;
   generate second detection signals that represents second polarization components of the first echoes; wherein the first polarization components are associated with a first polarization;
   wherein the second polarization components are associated with a second polarization that differs from the first polarization;
   wherein the signal processor is configured to process the first detection signals to provide an estimated polarization orientation of a target as a function of both (a) a ratio between intensities of the first polarization components and intensities of the second polarization components, and (b) phase differences between the first and second polarization components.

17. The system according to claim 16 wherein ρ is a ratio between an average of an absolute value of intensities of the first polarization components and an average of an absolute value of intensities of the second polarization components, and wherein ∅ is an average of the phase differences between the first and second polarization components; wherein the estimated polarization orientation of a target equals $$\frac{1}{2} * \arccos\left(\frac{(1-\rho^2)}{\sqrt{(1+\rho^2+2\rho\sin(\emptyset))} * \sqrt{(1+\rho^2-2\rho\sin(\emptyset))}}\right)$$

18. A method for detecting a target, the method comprises:
transmitting a first pulse train that comprises multiple radio frequency (RF) pulses of a first non-linear polarity;
receiving first echoes resulting from the transmission of the first pulse train;
generating first detection signals that represent the first echoes;
processing, by a hardware processor, the first detection signals to provide an estimated polarization orientation of a target; wherein the processing of the first detection signals comprises estimating a Jones matrix of the target.

19. A method for detecting a target, the method comprises:
transmitting a first pulse train that comprises multiple radio frequency (RF) pulses of a first non-linear polarity;
receiving, by a multiple polarization antenna, first echoes resulting from the transmission of the first pulse train;
generating first detection signals that represent first polarization components of the first echoes;
generating second detection signals that represents second polarization components of the first echoes;
wherein the first polarization components are associated with a first polarization;
wherein the second polarization components are associated with a second polarization that differs from the first polarization;
processing the first detection signals to provide an estimated polarization orientation of a target as a function of both (a) a ratio between intensities of the first polarization components and intensities of the second polarization components, and (b) phase differences between the first and second polarization components.

20. The method according to claim 19 wherein ρ is a ratio between an average of an absolute value of intensities of the first polarization components and an average of an absolute value of intensities of the second polarization components, and wherein ∅ is an average of the phase differences between the first and second polarization components; wherein the estimated polarization orientation of a target equals $$\frac{1}{2} * \arccos\left(\frac{(1-\rho^2)}{\sqrt{(1+\rho^2+2\rho\sin(\emptyset))} * \sqrt{(1+\rho^2-2\rho\sin(\emptyset))}}\right)$$

21. A non-transitory computer readable medium that stores instructions that once executed by a computer causes the computer to execute the steps of
transmitting a first pulse train that comprises multiple radio frequency (RF) pulses of a first non-linear polarity;
receiving, by a multiple polarization antenna, first echoes resulting from the transmission of the first pulse train;
generating first detection signals that represent first polarization components of the first echoes;
generating second detection signals that represents second polarization components of the first echoes;
wherein the first polarization components are associated with a first polarization;
wherein the second polarization components are associated with a second polarization that differs from the first polarization;
processing the first detection signals to provide an estimated polarization orientation of a target as a function of both (a) a ratio between intensities of the first polarization components and intensities of the second polarization components, and (b) phase differences between the first and second polarization components.

22. The non-transitory computer readable medium according to claim 21 wherein ρ is a ratio between an average of an absolute value of intensities of the first polarization components and an average of an absolute value of intensities of the second polarization components, and wherein ∅ is an average of the phase differences between the first and second polarization components; wherein the estimated polarization orientation of a target equals $$\frac{1}{2} * \arccos\left(\frac{(1-\rho^2)}{\sqrt{(1+\rho^2+2\rho\sin(\emptyset))} * \sqrt{(1+\rho^2-2\rho\sin(\emptyset))}}\right)$$

* * * * *

UNITED STATES PATENT AND TRADEMARK OFFICE
CERTIFICATE OF CORRECTION

Page 1 of 2

PATENT NO. : 10,054,667 B2
APPLICATION NO. : 14/805503
DATED : August 21, 2018
INVENTOR(S) : Alon Slapak and Haim Niv It is certified that error appears in the above-identified patent and that said Letters Patent is hereby corrected as shown below:

In the Specification

1. In Column 11, Line 63, delete:
"$E_A(r, t) = E_B \cdot e^{j(k \cdot z + \omega t)} \in^2$"
And insert:
--$\mathbf{E}_A(\mathbf{r}, t) = \mathbf{E}_B \cdot e^{j(k \cdot z + \omega t)} \in \mathbb{C}^2$--.

2. In Column 12, Line 1, delete:
"$E_B = [E_x E_y]^T \in^2$"
And insert:
--$\mathbf{E}_B = [E_x E_y]^T \in \mathbb{C}^2$--.

3. In Column 12, Lines 3-4, delete:
"$E(r, t) = R_e\{E_B \cdot e^{j(k \cdot z + \omega t)}\} = E_I \cos(k \cdot z + \omega t) - E_Q \sin(k \cdot z + \omega t) \in^2$"
And insert:
--$\mathbf{E}(\mathbf{r}, t) = R_e\{\mathbf{E}_B \cdot e^{j(k \cdot z + \omega t)}\} = \mathbf{E}_I \cos(k \cdot z + \omega t) - \mathbf{E}_Q \sin(k \cdot z + \omega t) \in \mathbb{R}^2$--.

4. In Column 12, Line 6, delete:
"$E_B = E_I + j \cdot E_Q \in^2$"
And insert:
--$\mathbf{E}_B = \mathbf{E}_I + j \cdot \mathbf{E}_Q \in \mathbb{C}^2$--.

5. In Column 12, Line 7, delete:
"$E(r, t) = |E_B| \cos(k \cdot z + \omega t + E_B) \in^2$"
And insert:
--$\mathbf{E}(\mathbf{r}, t) = |\mathbf{E}_B| \cos(k \cdot z + \omega t + \sphericalangle \mathbf{E}_B) \in \mathbb{R}^2$--.

Signed and Sealed this
Tenth Day of December, 2019

Andrei Iancu
*Director of the United States Patent and Trademark Office*

6. In Column 12, Lines 26-30, delete:

"$x(t) = |E_x| \cos(\omega t + E_x) \in$ $y(t) = |E_y| \cos(\omega t + E_y) \in$"

And insert:

--$x(t) = |E_x| \cos(\omega t + \sphericalangle E_x) \in \mathbb{R}$ $y(t) = |E_y| \cos(\omega t + \sphericalangle E_y) \in \mathbb{R}$--.

7. In Column 12, Line 36, delete:

"$\phi E_y - E_x$"

And insert:

--$\phi \triangleq \sphericalangle E_y - \sphericalangle E_x$--.

8. In Column 13, Lines 6-9, delete:

"$P \sqrt{|E_x|^2 + |E_y|^2 + 2|E_x||E_y| \sin(\phi)}$, $Q \sqrt{|E_x|^2 + |E_y|^2 - 2|E_x||E_y| \sin(\phi)}$"

And insert:

--$P \triangleq \sqrt{|E_x|^2 + |E_y|^2 + 2|E_x||E_y| \sin(\phi)}$, $Q \triangleq \sqrt{|E_x|^2 + |E_y|^2 - 2|E_x||E_y| \sin(\phi)}$--.

9. In Column 13, Lines 24-27, delete:

"$\rho \frac{|E_y|}{|E_x|} \in$"

And insert:

--$\rho \triangleq \frac{|E_y|}{|E_x|} \in \mathbb{R}$--.

10. In Column 13, Line 31, delete:

"$\phi E_y - E_x \in$"

And insert:

--$\phi \triangleq \sphericalangle E_y - \sphericalangle E_x \in \mathbb{R}$--.

11. In Column 13, Line 37, delete:

"$\gamma \frac{a}{b}$"

And insert:

--$\gamma \triangleq \frac{a}{b}$--.